May 31, 1966 H. SAUERESSIG 3,253,323
PRESSURE ROLLER
Filed Nov. 29, 1963 4 Sheets-Sheet 2

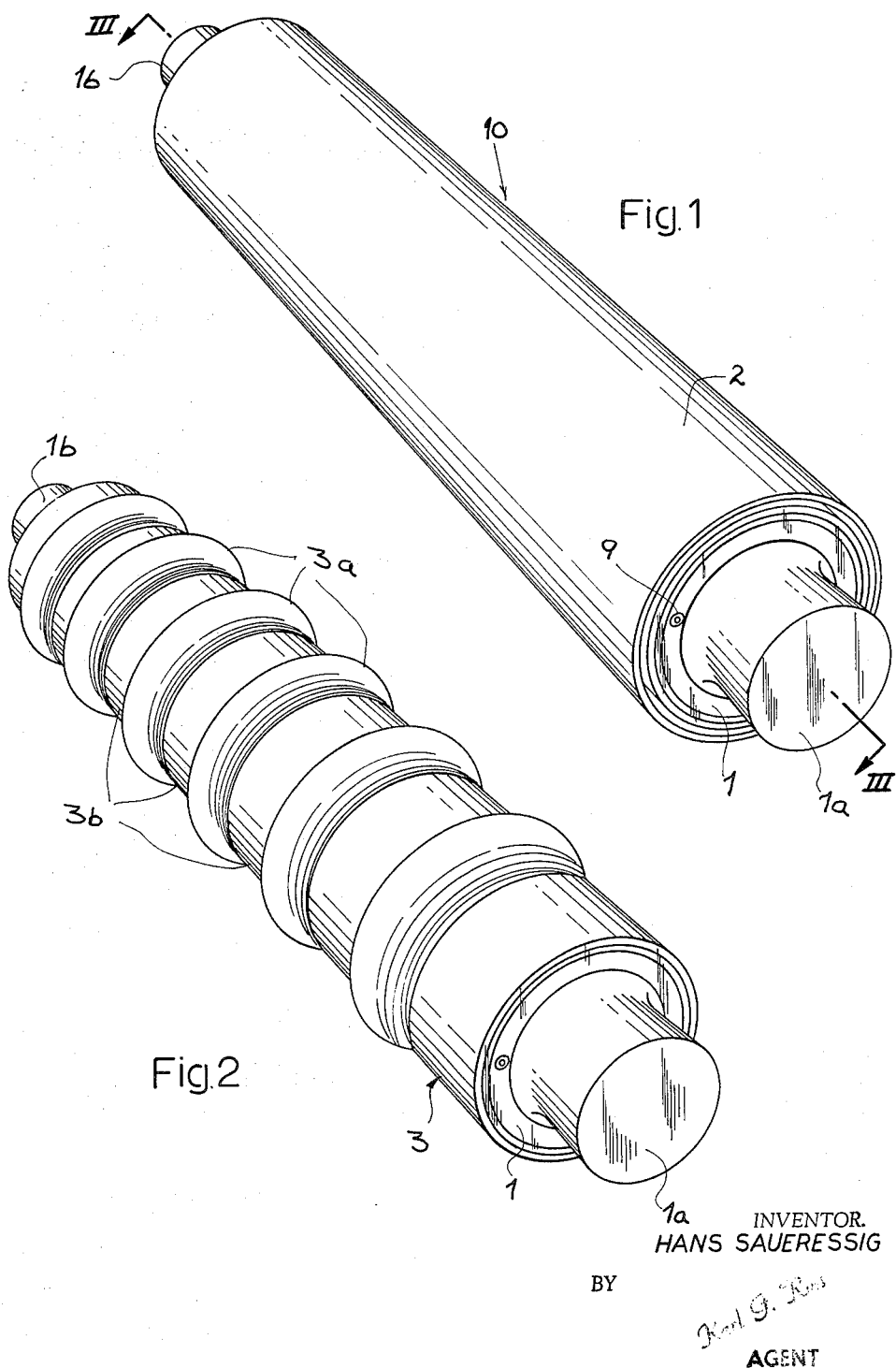

HANS SAUERESSIG
INVENTOR.

BY Karl G. Ross
AGENT

May 31, 1966 H. SAUERESSIG 3,253,323
PRESSURE ROLLER
Filed Nov. 29, 1963 4 Sheets-Sheet 3

HANS SAUERESSIG
INVENTOR.

BY

AGENT

May 31, 1966  H. SAUERESSIG  3,253,323
PRESSURE ROLLER

Filed Nov. 29, 1963  4 Sheets-Sheet 4

HANS SAUERESSIG
INVENTOR.

BY

United States Patent Office 3,253,323
Patented May 31, 1966

3,253,323
PRESSURE ROLLER
Hans Saueressig, Wullen, Kreis Ahaus, Westphalia, Germany, assignor to Gebr. Saueressig K.G. Maschinenfabrik, Ahaus, Westphalia, Germany, a corporation of Germany
Filed Nov. 29, 1963, Ser. No. 326,970
Claims priority, application Germany, Dec. 1, 1962, S 82,681
5 Claims. (Cl. 29—113)

The present invention relates to a pressure roller as used for printing, embossing, calendering or conveying sheet material and the like.

Pressure rollers of this type are usually made in two parts including a drive shaft connectable to a source of power and a cylindrical sleeve which, in the case of a printing or embossing roller, carries the design or pattern to be reproduced and which is so supported on the shaft as to be readily removable therefrom for resurfacing or for replacement by another cylinder of different design, size or condition.

To facilitate assembly and disassembly, it has been the practice to make the exterior of the shaft and the interior of the sleeve complementarily conical, yet such a shaping of the interfitting members is difficult, costly and time-consuming. Attempts at removably coupling the two members to each other by mechanical means have been generally unsuccessful, largely because of space limitations.

It is, therefore, an object of my present invention to provide improved means for removably coupling an outer sleeve of a pressure roller, having the form of a cylindrical tube, to a drive shaft therefor in such manner that the torque of the shaft is fully transmitted to the sleeve.

A more particular object of this invention is to provide coupling means of this type which can readily be fitted in a narrow annular clearance between the shaft and its sleeve, as will be the case in situations where the minimum diameter of the shaft (as well as the minimum thickness of the sleeve) is determined by the pressure to be developed whereas the outer sleeve diameter is limited by the nature of the work to be performed.

It is a further object of this invention to provide coupling means for the aforestated purpose adapted to distribute the pressure of the roller in a substantially even manner over the shaft surface.

The foregoing objects are realized, in accordance with my instant invention, by the provision of coupling means in the form of an inflatable cushion so inserted between the shaft and the sleeve as to center the latter on the former, the cushion being positively secured to one of these members (preferably the shaft) and frictionally contacting the other (thus, by preference, the sleeve) for the transmission of torques and pressures therebetween.

The positive attachment of the cushion to, say, the shaft may be brought about by a variety of means, including adhesive bonding (e.g. by vulcanization) and mechanical clamping, so that cushion and shaft form a permanent or semipermanent unit onto which the sleeve may be axially slipped and from which it may be easily removed in the deflated condition of the cushion.

While it is preferred to divide the cushion into a multiplicity of sections that are independently but concurrently inflatable, for the purpose of more even distribution of the load, it is advantageous to have these sections united into a continuous body having noninflatable portions which separate the inflatable sections from one another and serve for the positive attachment of the cushion to its carrier.

The frictional contact between the shaft-supported cushion and the sleeve may be enhanced by forming the latter with a rough inner peripheral surface, e.g. as obtained in a raw-forming process, whereupon the outer periphery of the sleeve may be suitably machined or otherwise conditioned to act as the surface of a printing roller or the like. In particular, the sleeve may be made of steel and provided, e.g. galvanically, with an outer coating of copper adapted to be suitably engraved for printing purposes.

The invention will be described in greater detail with reference to the accompanying drawing in which:

FIG. 1 is a perspective view of a pressure roller according to the invention;

FIG. 2 is a view similar to FIG. 1, showing the roller shaft and an inflatable insert thereon with the sleeve removed;

Figure 3:
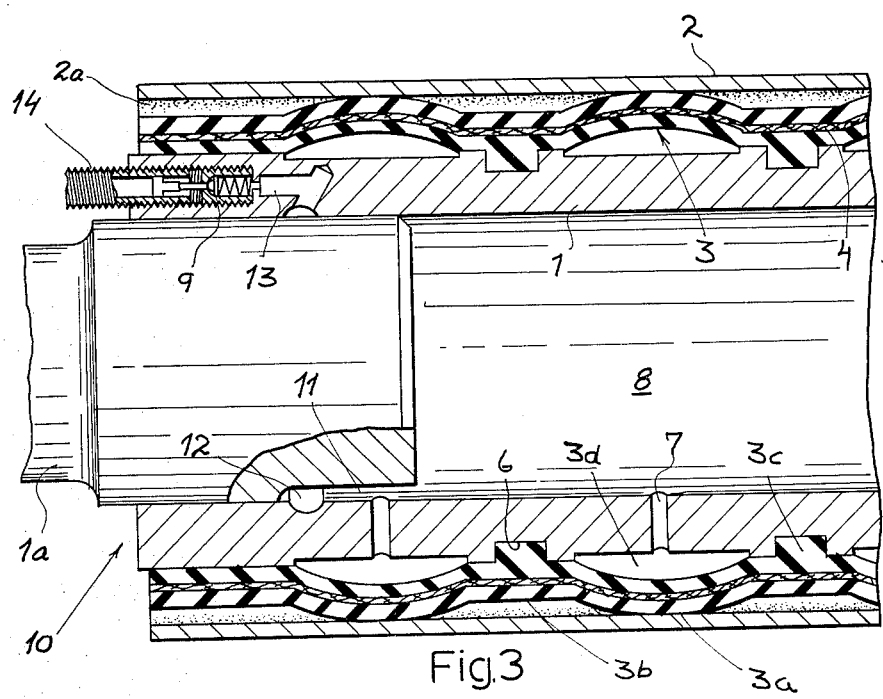
FIG. 3 is an axial sectional view of the embodiment shown in FIGS. 1 and 2, taken on the line III—III of FIG. 1.

The roller 10 shown in FIGS. 1–3 comprises a tubular shaft 1 with gudgeons 1a, 1b press-fitted endwise into the shaft body. This shaft is coaxially surrounded by a cylindrical sleeve 2 which may be a copper-clad steel tube with a roughened inner peripheral surface 2a as described above. Sleeve 2 is removably held in position on shaft 1 by an inflatable insert 3, here shown as a rubber cushion with a textile layer 4, of the type customarily used for automobile tires, embedded therein as a reinforcement.

The cushion 3 is axially subdivided into a multiplicity of inflatable annular sections 3a alternating with noninflatable annular portions 3b. The portions 3b have inner ridges 3c received in annular grooves 6 of shaft 1, the resulting positive connection between the shaft and the cushion being advantageously strengthened by vulcanization of the portions 3b onto the shaft surface. The sections 3a, when inflated, define annular air compartments 3d which communicate with the interior 8 of shaft 1 by way of individual radial bores 7. Gudgeon 1a is shown provided with a longitudinal groove 11 which communicates with an annular groove 12 in the tubular shaft body, the latter groove opening into an outwardly leading passage 13 by which the entire conduit system 7, 8 and 11–13 can be connected with a supply line 14 extending from a source of compressed air or other gas, not shown. A check valve 9 in the terminal part of passage 13 maintains the cushion 3 inflated after it has been disconnected from the line 14, the valve 9 being advantageously of a construction conventional in automobile tires so as to be openable, upon removal of a protective cap not shown, by manual pressure upon a projecting stem to release the entrapped air.

Figure 4:
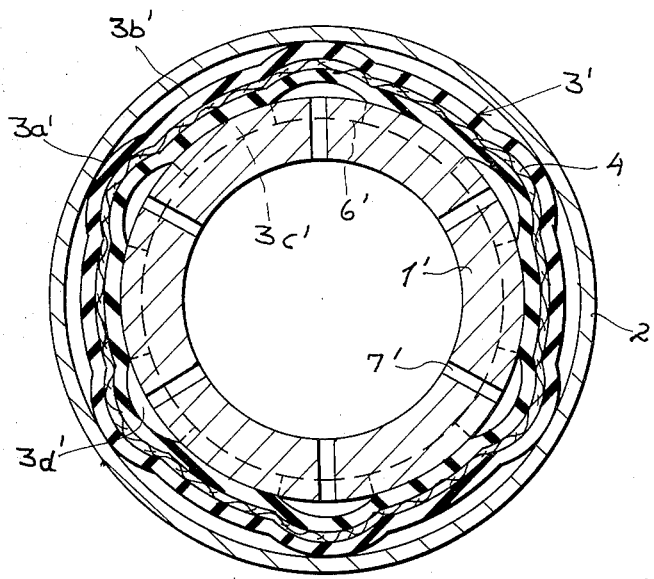
FIG. 4 is a cross-sectional view of a roller similar to that of FIGS. 1 and 3 but with a modified inflatable insert.

As illustrated in FIG. 4, cushion 3 may be replaced by a modified cushion 3' whose inflatable sections 3a' have the form of peripherally spaced longitudinal ribs separated by noninflatable portions 3b', the latter being again provided with internal projections 3c' received in recesses 6' of the shaft 1'. Thus the air pockets 3d', again communicating with the interior of shaft 1' via individual bores 7', also extend parallel to the roller axis.

Figure 5:
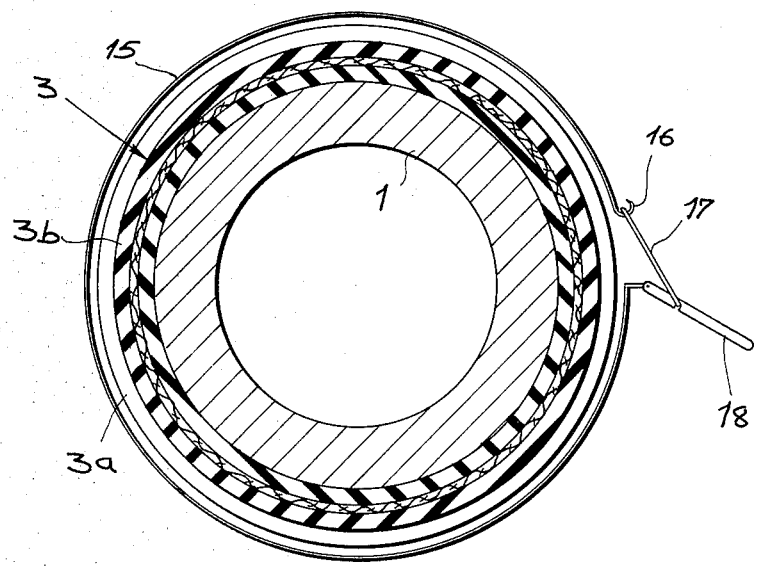
FIG. 5 is a cross-sectional view of part of another roller according to the invention, illustrating modified means for securing an inflatable insert to its shaft.

As illustrated in FIG. 5, the axially subdivided insert 3 may also be mechanically secured to shaft 1 with the aid of individual clamping rings 15 (only one shown) each disposed between two inflatable sections 3a so as to embrace a respective noninflatable portion 3b of the insert. The clamping ring 15 shown in FIG. 5 is a strap formed at one end with a hook 16 engageable in the well-known manner, by a looped latch 17 which can be drawn into clamping position by a lever 18 fulcrumed on the other end of the strap. It will be understood that ring 15 is representative of a variety of mechanical clamping devices known per se.

Figure 6:
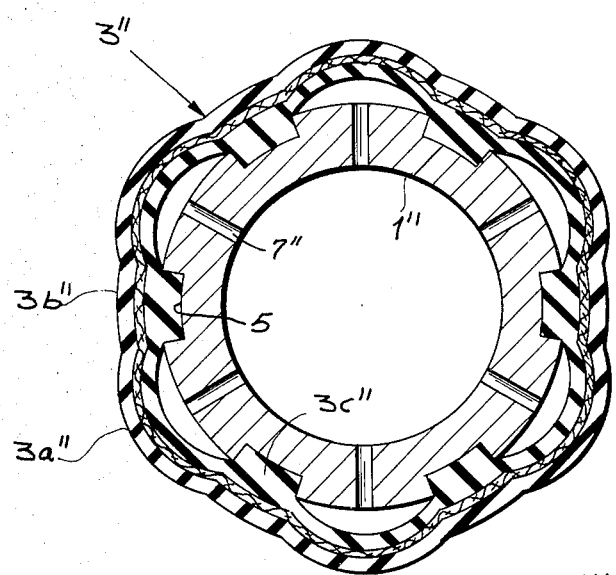
FIG. 6 is a further cross-sectional view, illustrating still another modification.

In FIG. 6, I have shown a cushion 3", similar to the insert 3' of FIG. 4, mounted on a modified shaft 1" which is formed with longitudinal grooves 5 to receive inwardly projecting longitudinal ribs 3c" of the noninflatable cushion portions 3b". The inflatable sections 3a" of the cushion are of substantially the same shape as the corresponding sections 3a' in FIG. 4.

Figure 7:
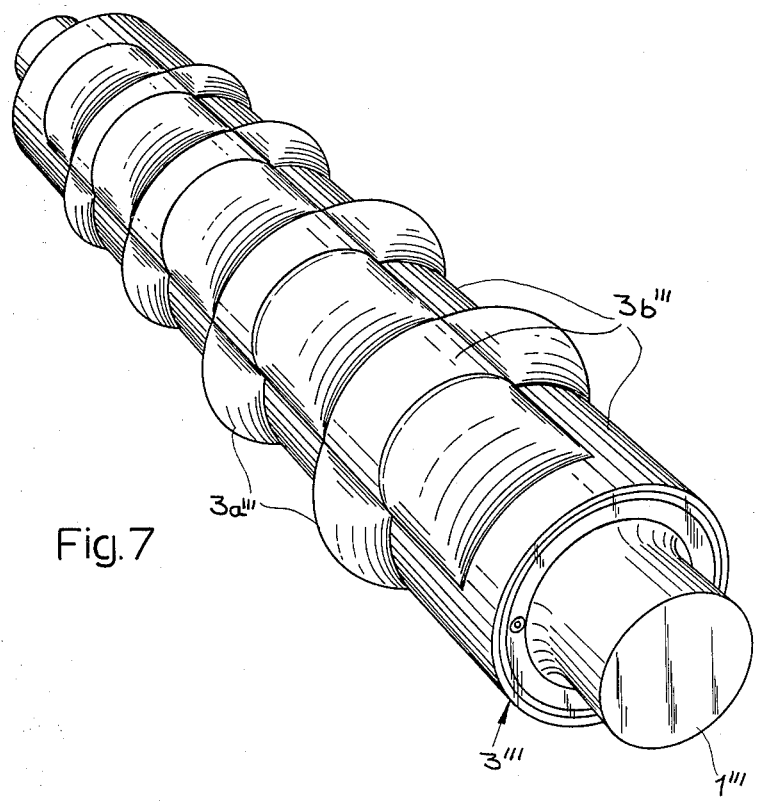
FIG. 7 is a perspective view similar to FIG. 2 but showing a different type of inflatable insert.

FIG. 7 shows a cushion 3''' whose inflatable sections 3a''' alternate with its noninflatable portions 3b''' in checkerboard fashion, this cushion thus effectively constituting a cross between the configurations shown in FIGS. 3 and 4. The shaft 1''' may again be peripherally recessed to accommodate inward extensions of the noninflatable sections 3b''', apart from having bores communicating with the inflatable portions 3a''' as shown at 7, 7' and 7" in the preceding figures.

It will be understood that the air pressure maintained in the inserted cushion during operation will always have to be sufficient to prevent the cylindrical sleeve 2 from coming into contact, even under maximum operating stresses, with the noninflatable portions of the cushion or with other parts of its support such as, for example, the clamping means 15 and 18 of FIG. 5.

Further modifications of the arrangements described and illustrated, including combinations of compatible features of different embodiments, are of course possible without departing from the spirit and scope of the invention as defined in the appended claims.

I claim:

1. A pressure roller comprising a shaft connectable to a source of motive power, said shaft being provided with peripheral grooves, a cylindrical sleeve removably surrounding said shaft with annular clearance, a continuous body including a plurality of inflatable cushion sections disposed in said clearance at axially spaced locations for frictionally connecting said shaft with said sleeve, said body further including noninflatable portions between said sections and being positively secured to said shaft by said noninflatable portions for enabling removal of said sleeve from said shaft in a deflated condition of said inflatable sections, and conduit means for concurrently inflating said cushion sections by admitting a fluid under pressure into same, said noninflatable portions being at least partly received in said grooves.

2. A pressure roller as defined in claim 1 wherein said inflatable sections and said noninflatable portions are generally annular and alternate with one another along the shaft.

3. A pressure roller as defined in claim 2, further comprising annular clamping means individually embracing said noninflatable portions for holding them against said shaft.

4. A pressure roller as defined in claim 1 wherein said body is composed of elastomeric material with imbedded textile reinforcement.

5. A pressure roller as defined in claim 1, further comprising check-valve means in said conduit means at an extremity of said shaft for releasably maintaining said cushion means under fluid pressure.

References Cited by the Examiner

UNITED STATES PATENTS

| | | | |
|---|---|---|---|
| 2,127,824 | 8/1938 | Leuchter | 101—375 |
| 2,331,743 | 10/1943 | Sullivan | 242—72 |
| 2,849,192 | 8/1958 | Fairchild | 242—72 |
| 2,876,961 | 3/1959 | Cole et al. | 242—72 |
| 2,987,994 | 6/1961 | Allison | 101—375 |
| 3,006,277 | 10/1961 | Willard | 29—113 X |
| 3,046,637 | 7/1962 | Kusters et al. | 29—113 |
| 3,096,949 | 7/1963 | Huffman | 242—72 |
| 3,104,074 | 9/1963 | Karr | 242—72 |

WALTER A. SCHEEL, *Primary Examiner.*

BILLY J. WILHITE, *Examiner.*